US008564654B2

(12) United States Patent
Ogihara

(10) Patent No.: US 8,564,654 B2
(45) Date of Patent: Oct. 22, 2013

(54) IMAGE PICK-UP APPARATUS

(75) Inventor: Tomoharu Ogihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 325 days.

(21) Appl. No.: 13/159,805

(22) Filed: Jun. 14, 2011

(65) Prior Publication Data

US 2011/0310239 A1    Dec. 22, 2011

(30) Foreign Application Priority Data

Jun. 21, 2010 (JP) ................................ 2010-140801

(51) Int. Cl.
*H04N 5/915* (2006.01)
(52) U.S. Cl.
USPC ............... 348/79; 348/23; 358/509; 358/510; 358/511; 358/512
(58) Field of Classification Search
USPC .......................................................... 348/79
See application file for complete search history.

(56) References Cited

U.S. PATENT DOCUMENTS

| 4,907,074 A | 3/1990 | Hashimoto |
| 5,018,006 A | 5/1991 | Hashimoto |
| 6,184,933 B1 | 2/2001 | Ogura |
| 6,614,471 B1 | 9/2003 | Ott |
| 2002/0041332 A1* | 4/2002 | Murata et al. ................. 348/272 |
| 2003/0048493 A1* | 3/2003 | Pontifex et al. ............... 358/514 |
| 2008/0012969 A1 | 1/2008 | Kasai et al. |
| 2011/0141260 A1* | 6/2011 | Ouchi et al. .................... 348/79 |

FOREIGN PATENT DOCUMENTS

| JP | 62-104294 | 5/1987 |
| JP | 05-076015 | 3/1993 |
| JP | 8-79597 | 3/1996 |
| WO | WO 00/07370 A1 | 2/2000 |

OTHER PUBLICATIONS

European Search Report dated Jun. 27, 2012 from corresponding European Patent Application No. EP 11 00 4851.9.

* cited by examiner

*Primary Examiner* — David Czekaj
*Assistant Examiner* — Tison B Owens
(74) *Attorney, Agent, or Firm* — Scully, Scott, Murphy & Presser, P.C.

(57) ABSTRACT

An image pick-up apparatus includes: a color imager having a color filter formed on a light receiving surface thereof; a monochrome imager not having a color filter formed on a light receiving surface thereof; a light guiding unit for guiding, to the color imager and/or the monochrome imager, light originating from a subject; and an image formation unit for forming an image from a signal based on an output from the color imager and/or the monochrome imager.

8 Claims, 7 Drawing Sheets

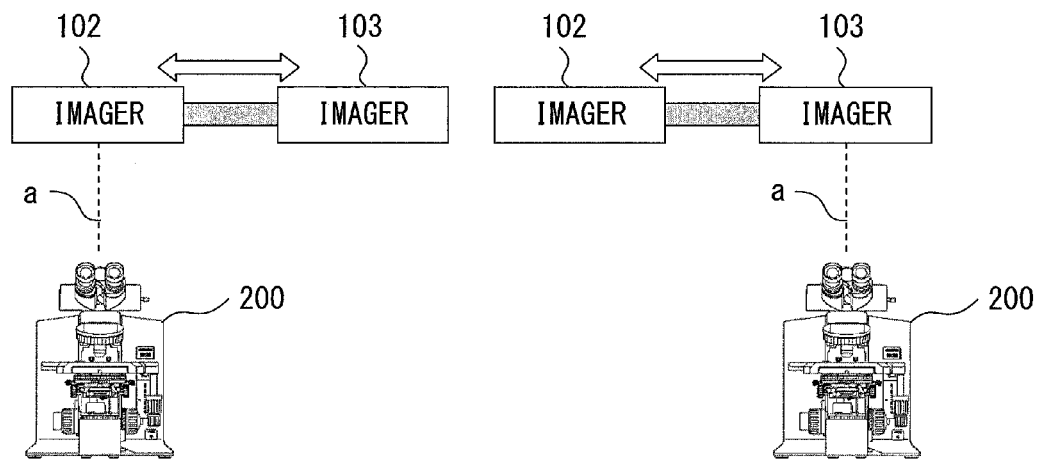
F I G. 7A
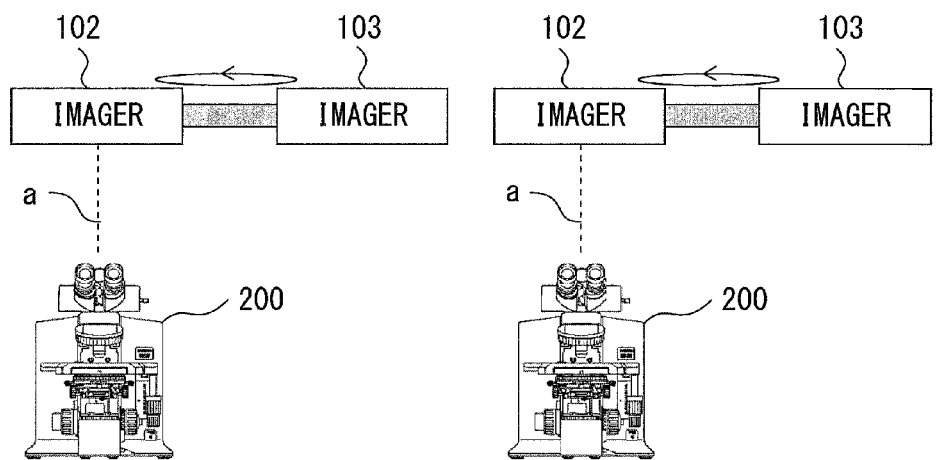
F I G. 7B ic # IMAGE PICK-UP APPARATUS

CROSS REFERENCE TO RELATED APPLICATIONS

This application is based upon and claims the benefit of priority from the prior Japanese Patent Application No. 2010-140801, filed Jun. 21, 2010, the entire contents of which are incorporated herein by this reference.

BACKGROUND OF THE INVENTION

1. Field of the Invention

The present invention relates to a multi-plate type image pick-up apparatus provided with a plurality of imagers.

2. Description of the Related Art

Conventionally, imagers (image pick-up tubes and solid state imagers) have been widely used for image pick-up apparatuses. In particular, in regard to a color imager mounted on a color image pick-up apparatus of a single pipe type or a single-plate type (Single Sensor), a color image pick-up unit can be configured with one imager; therefore, since a color separation prism is not needed, the lens can be miniaturized. Such a type of color imager has many characters as follows: The adjustment of the position of each imager or the like, which would need to be performed for multi-plate type imagers, does not need to be performed; Since only one imager is needed, the power consumption is small; and so on. The color imagers greatly contribute to the miniaturization of color image pick-up apparatuses and to power saving. In particular, a single-plate type color camera in which a color CCD (Charge Coupled Device) imager is used is a mainstream image pick-up apparatus.

Since all of the aforementioned color imagers obtain color information on one light receiving surface, they modulate a color within the light receiving surface by using a color filter called a stripe filter, a mosaic filter, or the like. In other words, the color imagers have, for example, a structure in which a color filter of one of RGB colors is put on each photoelectric transducer (each pixel) in a predetermined regular arrangement; accordingly, each pixel has a different spectral responsivity.

An image signal obtained via a color imager picking up the image of a subject includes dot-sequential color information which depends on the arrangement of color filters. Accordingly, in accordance with the arrangement of the color filters, the obtained image signal is separated into signals each corresponding to the color of a color filter. By extracting the separated signals, color information can be extracted; therefore, color image pick-up can be performed using one imager.

As an example, in regard to multi-plate type color image pick-up apparatuses, the following apparatuses are proposed. Japanese Laid-open Patent Publication No. 62-104294 proposes a multi-plate type image pick-up apparatus which achieves a high sensitivity and a high resolution. Japanese Laid-open Patent Publication No. 5-76015 proposes a two-plate type image pick-up apparatus which reduces color moire and achieves a high resolution. Japanese Laid-open Patent Publication No. 8-79597 proposes a multi-plate type image pick-up apparatus which can pick up the image of a subject and detect the state of incident light at the same time.

SUMMARY OF THE INVENTION

An image pick-up apparatus according to an aspect of the present invention includes: a color imager having a color filter formed on a light receiving surface thereof; a monochrome imager not having a color filter formed on a light receiving surface thereof; a light guiding unit for guiding, to the color imager and/or the monochrome imager, light originating from a subject; and an image formation unit for forming an image from a signal which is based on an output from the color imager and/or the monochrome imager.

BRIEF DESCRIPTION OF THE DRAWINGS

The present invention will be more apparent from the following detailed description when the accompanying drawings are referenced.

FIG. 7A is a diagram illustrating a variation of the image pick-up apparatus according to embodiment 2.

FIG. 7B is a diagram illustrating another variation of the image pick-up apparatus according to embodiment 2.

DESCRIPTION OF THE PREFERRED EMBODIMENTS

In the following, embodiments of the present invention will be described with reference to the drawings.

Embodiment 1

Figure 1:
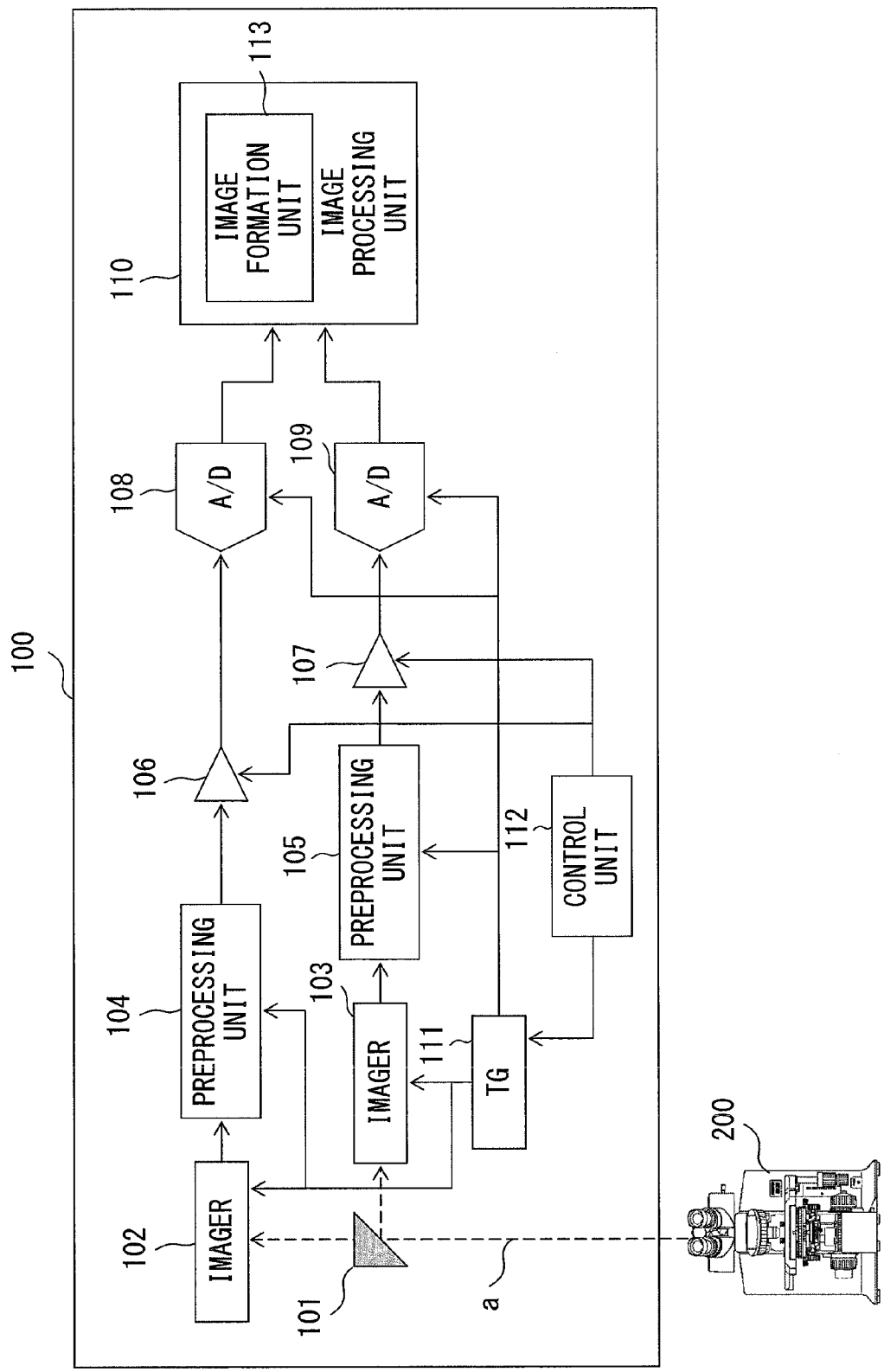
FIG. 1 is a diagram showing an exemplary configuration of an image pick-up apparatus according to embodiment 1.

FIG. 1 is a diagram showing an exemplary configuration of an image pick-up apparatus according to embodiment 1 of the present invention.

As shown in FIG. 1, an image pick-up apparatus 100 according to the present embodiment is an apparatus that can form a color image by picking up an observation image of a sample (not shown) observed under a microscope 200.

The microscope 200 is configured so that an observation image of a sample can be visually observed and the observation image can be sent along an observation light path a to the outside.

As main components, the image pick-up apparatus 100 includes a prism 101, two imagers 102 and 103, two preprocessing units 104 and 105, two amplification units 106 and 107, two A/D conversion units 108 and 109, an image processing unit 110, a timing generator (hereinafter referred to as "TG") 111, and a control unit 112.

The prism 101 is an optical element that divides the observation light path a into two paths, divides an observation image sent from the microscope 200 along the observation light path a, and sends the divisions to the imagers 102 and 103. The prism 101 is an optical element that divides the light path of light originating from a subject into two paths, and this optical element is an example of a light guiding unit for guiding, to the imagers 102 and 103, light originating from the subject.

The imagers 102 and 103 are, for example, CCDs, CMOSs (Complementary Metal Oxide Semiconductors), or the like. The imager 102 is a color imager having a color filter formed on the light receiving surface thereof. The imager 103 is a monochrome imager not having a color filter formed on the light receiving surface thereof. In the present embodiment, the color filters formed on the light receiving surface of the color imager 102 are primary color filters of red (R), green (G), and blue (B) regularly arranged on each pixel. As an example, as the color filters, color filters in the Bayer arrangement can be adopted. The color imager 102 and the monochrome imager 103 are positioned so that they pick up the image of the same portion of a subject (i.e., the sample not shown in this example).

The preprocessing unit 104 converts an output signal from the color imager 102 into an image signal. The preprocessing unit 105 converts an output signal from the monochrome imager 103 into an image signal.

The amplification unit 106 amplifies the signal having been converted into an image signal by the preprocessing unit 104. The amplification unit 107 amplifies the signal having been converted into an image signal by the preprocessing unit 105.

The A/D conversion unit 108 converts the image signal (analog signal) amplified by the amplification unit 106 into a digital signal. The A/D conversion unit 109 converts the image signal (analog signal) amplified by the amplification unit 107 into a digital signal.

The image processing unit 110 has a function for performing a color filter process and includes an image formation unit 113 which performs luminance/chrominance conversion (YC conversion) and calculates color information, and this will be described in detail later. The image formation unit 113 is an example of an image formation unit for forming an image from a signal which is based on outputs from the color imager 102 and the monochrome imager 103.

The TG 111 is controlled by the control unit 112 which will be described later, and it generates a pulse required to control the color imager 102, the monochrome imager 103, and the A/D conversion units 108 and 109.

The control unit 112 has a function for controlling the TG 111 and the amplification units 106 and 107 in accordance with the exposure time period and the amplification factor.

Figure 2:
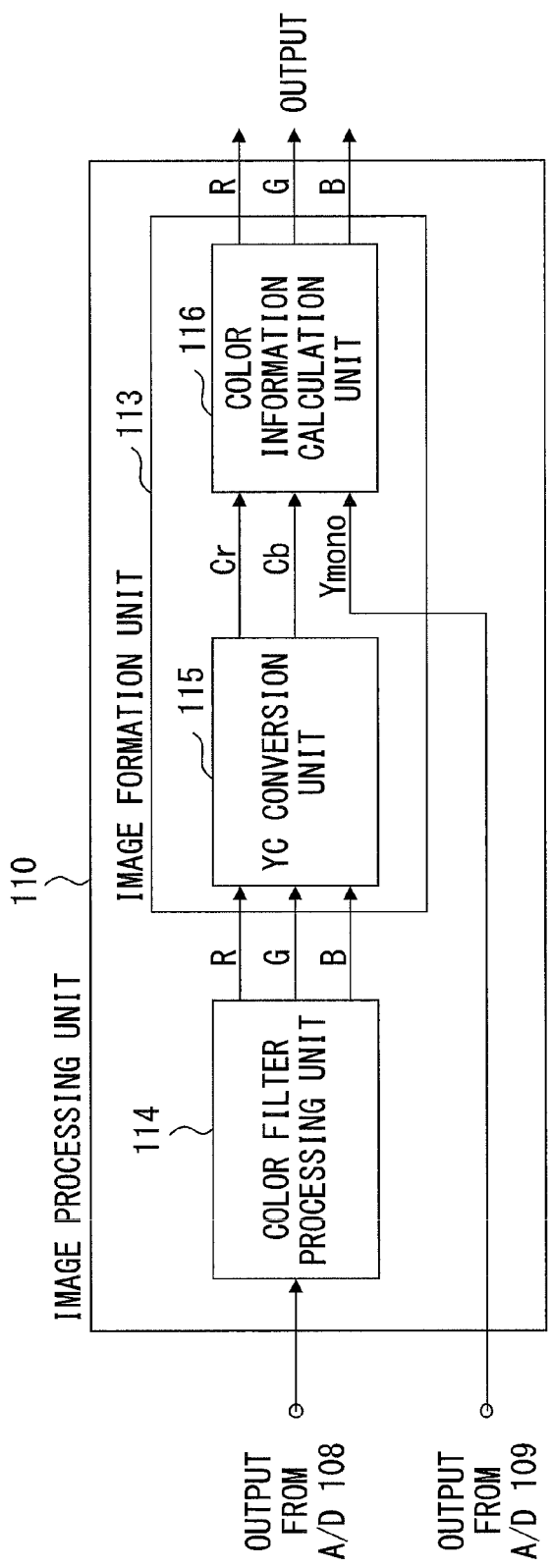
FIG. 2 is a diagram showing an exemplary configuration of an image processing unit according to embodiment 1 in more detail.

FIG. 2 is a diagram showing an exemplary configuration of the image processing unit 110 in more detail.

As shown in FIG. 2, the image processing unit 110 includes a color filter processing unit 114 and the image formation unit 113 as main components. The image formation unit 113 includes a YC conversion unit 115 and a color information calculation unit 116.

The color filter processing unit 114 performs a process for obtaining color information on each of R, G and B from an output signal from the A/D conversion unit 108 (a color filter process).

The YC conversion unit 115 performs luminance/chrominance image conversion on the basis of color information on each of R, G, and B obtained by the color filter processing unit 114. In other words, it converts the color information on R, G, and B into a luminance signal $Y_{color}$ and a chrominance signal Cr, Cb by using, for example, the following formula (1).

$$\begin{pmatrix} Y_{color} \\ Cr \\ Cb \end{pmatrix} = \begin{pmatrix} 0.299 & 0.587 & 0.114 \\ 0.500 & -0.419 & -0.081 \\ -0.169 & -0.331 & 0.500 \end{pmatrix} \cdot \begin{pmatrix} R \\ G \\ B \end{pmatrix} \quad \text{Formula (1)}$$

Here, the luminance signal $Y_{color}$ represents a luminance signal obtained from a signal that is based on an output from the color imager 102. The YC conversion unit 115 is an example of the calculation unit for calculating a chrominance signal from the signal which is based on an output from the color imager 102.

The color information calculation unit 116 uses an output signal from the A/D conversion unit 109 as a luminance signal $Y_{mono}$, and converts the luminance signal $Y_{mono}$ and the chrominance signal Cr, Cb obtained via conversion by the YC conversion unit 115 into color information on R, G, and B by using, for example, the following formula (2).

$$\begin{pmatrix} R \\ G \\ B \end{pmatrix} = \begin{pmatrix} 1.000 & 1.402 & 0 \\ 1.000 & -0.714 & -0.344 \\ 1.000 & 0 & 1.772 \end{pmatrix} \cdot \begin{pmatrix} Y_{mono} \\ Cr \\ Cb \end{pmatrix} \quad \text{Formula (2)}$$

That is, in regard to the luminance signal $Y_{color}$ and the chrominance signal Cr, Cb obtained via the conversion by the YC conversion unit 115, the luminance signal $Y_{color}$ is replaced with the luminance signal $Y_{mono}$, and the luminance signal $Y_{mono}$ mono and the chrominance signal Cr, Cb are then converted into color information on R, G, and B. Here, the luminance signal $Y_{mono}$ mono represents a luminance signal obtained from a signal that is based on the output from the monochrome imager 103.

As described above, the image formation unit 113 uses, as a luminance signal $Y_{mono}$, a signal based on an output from the monochrome imager 103, and uses the luminance signal $Y_{mono}$ and the chrominance signal Cr, Cb obtained from a signal based on the output from the color imager 102 so as to obtain color information on R, G, and B, with the result that a color image is formed.

Color information on R, G, and B obtained via the conversion by the color information calculation unit 116 can then be recorded on a record medium (not shown) or can be output to a display device (not shown) which displays a color image corresponding to the color information on R, G, and B.

The flow of processing series performed by the image pick-up apparatus 100 having such a configuration is generally as follows.

First, the light path of an observation image of a sample sent from the microscope 200 along the observation light path a is divided by the prism 101 into two paths, one of which is sent to the color imager 102 and the other of which is sent to the monochrome imager 103.

Next, the color imager 102 and the monochrome imager 103 each pick up the formed observation image. In other words, they each convert the formed observation image into an electrical signal and each output it to the subsequent stage. The color imager 102 and the monochrome imager 103 simultaneously pick up the image. The control unit 112 controls the exposure time period of each of the color imager 102 and the monochrome imager 103.

Next, the preprocessing units 104 and 105 each convert the electrical signal output from the preceding stage into an image signal and each output it to the subsequent stage. The preprocessing units 104 and 105 convert the electrical signals into image signals in accordance with control pulses output from the TG 111.

Next, the amplification units 106 and 107 each amplify the image signal output from the preceding stage and each output it to the subsequent stage. The amplification units 106 and 107 amplify image signals in accordance with an amplification factor set by the control unit 112.

Next, the A/D conversion units 108 and 109 each convert the image signal amplified in the preceding stage (an analog signal) into a digital signal and each output it to the image processing unit 110. The A/D conversion units 108 and 109 convert the image signals under the control of the control unit 112.

Next, in the image processing unit 110, the color filter processing unit 114 obtains color information on R, G, and B from the output signal from the A/D conversion unit 108, and outputs it to the image formation unit 113.

Next, in the image formation unit 113, the YC conversion unit 115 converts the color information on R, G, and B output from the color filter processing unit 114 into a chrominance signal Cr, Cb and a luminance signal $Y_{color}$ by using, for example, the formula (1), and outputs only the chrominance signal Cr, Cb to the color information calculation unit 116.

Next, the color information calculation unit 116 uses the output signal from the A/D conversion unit 109 as a luminance signal $Y_{mono}$, converts the luminance signal $Y_{mono}$ and the chrominance signal Cr, Cb output from the YC conversion unit 115 into color information on R, G, and B by using, for example, the formula (2), and outputs it.

Through such a processing series, a color image of an observation image of a sample sent from the microscope (the body of a microscope) 200 is formed.

As described above, instead of a luminance signal $Y_{color}$ obtained from the signal which is based on an output from the color imager 102, the image pick-up apparatus 100 according to the present embodiment uses, as a luminance signal $Y_{mono}$, the signal which is based on an output from the monochrome imager 103, so as to generate color information on R, G, and B; therefore, color images can be obtained without decreasing luminance resolution.

Embodiment 2

An image pick-up apparatus according to embodiment 2 of the present invention is an apparatus that can form a color image or a monochrome image by picking up an observation image of a sample (not shown) observed under a microscope.

Figure 3:
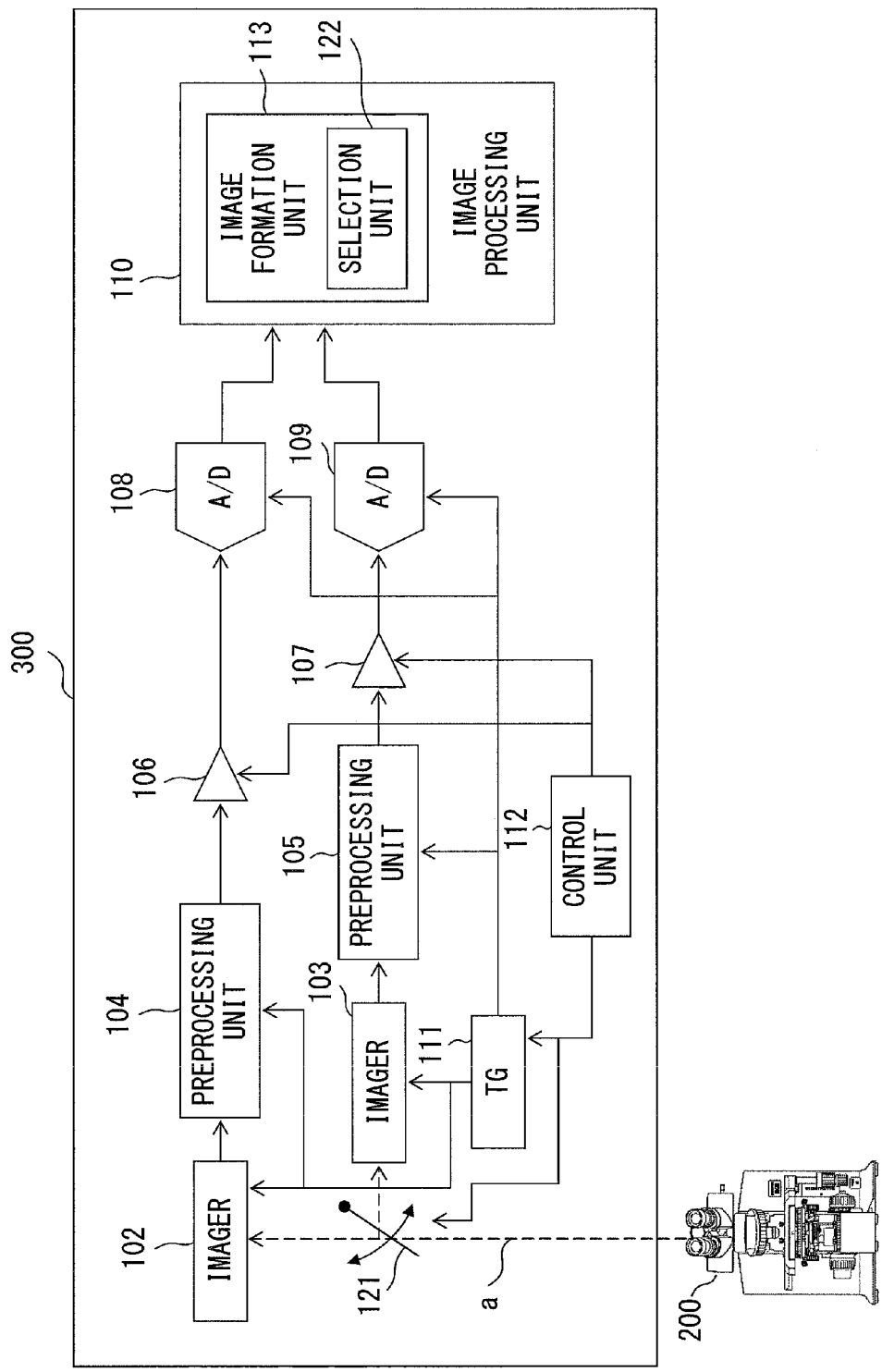
FIG. 3 is a diagram showing an exemplary configuration of an image pick-up apparatus according to embodiment 2.

FIG. 3 is a diagram showing an exemplary configuration of the image pick-up apparatus according to the present embodiment.

As shown in FIG. 3, the image pick-up apparatus 300 according to the present embodiment is different from the image pick-up apparatus 100 according to embodiment 1 shown in FIG. 1 in the following respects.

The image pick-up apparatus 300 is different in the sense that a deformable mirror 121 is provided instead of the prism 101. It is also different in the sense that the configuration of the image formation unit 113 is partly different (e.g., the image formation unit 113 further includes a selection unit 122). The image pick-up apparatus 300 is also different in the sense that, in accordance with these differences, the control unit 112 further controls the deformable mirror 121 and the selection unit 122.

In regard to the points other than the differences above, the configuration of the image pick-up apparatus 300 is the same as that of the image pick-up apparatus 100 according to embodiment 1. Accordingly, like components are indicated by like numerals indicating the components of the image pick-up apparatus 100 according to embodiment 1.

In the image pick-up apparatus 300 according to the present embodiment, when the deformable mirror 121 is switched, the observation light path a is switched so that it leads to the color imager 102 or the monochrome imager 103. In accordance with an operator's instruction, the deformable mirror 121 is switched by a switching mechanism (not shown) under the control of the control unit 112. In this case, the operator's instruction is given via, for example, an operation unit (not shown) of the image pick-up apparatus 300. The deformable mirror 121 is an example of the light guiding unit for guiding, to the color imager 102 or the monochrome imager 103, light originating from a subject in accordance with an operator's instruction.

In accordance with the switching of the deformable mirror 121 ordered by the operator, the selection unit 122 performs a process for selecting a signal under the control of the control unit 112, and this process will be described later.

Figure 4:
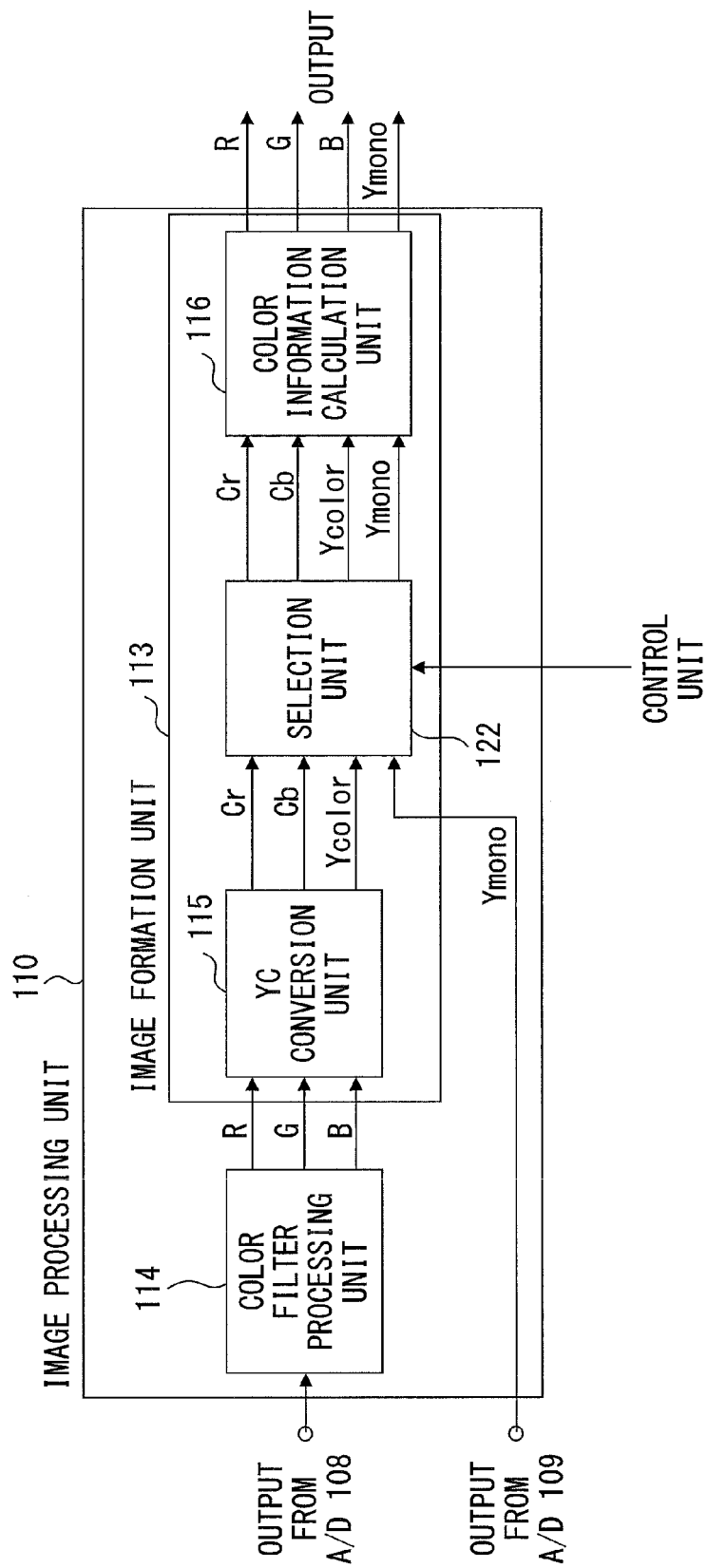
FIG. 4 is a diagram showing an exemplary configuration of an image processing unit according to embodiment 2 in more detail.

FIG. 4 is a diagram showing an exemplary configuration of the image processing unit 110 according to the present embodiment in more detail.

As shown in FIG. 4, the image processing unit 110 according to the present embodiment is the same as the image processing unit 110 according to embodiment 1 in the sense that the image processing unit 110 according to the present embodiment includes a color filter 114 and an image formation unit 113 as main components; however, the configuration of the image formation unit 113 of the image processing unit 110 according to the present embodiment is partly different.

That is, the image formation unit 113 according to the present embodiment further includes a selection unit 122. Accordingly, the process flow is different from that of the image formation unit 113 according to embodiment 1. The image formation unit 113 according to the present embodiment is an example of the image formation unit for forming, in accordance with an operator's instruction, an image from a signal which is based on an output from the color imager 102 or the monochrome imager 103.

The YC conversion unit 115 of the image formation unit 113 according to the present embodiment is the same as the YC conversion unit 115 according to embodiment 1 in the sense that the YC conversion unit 115 of the image formation unit 113 according to the present embodiment converts color information on R, G, and B obtained from the color filter processing unit 114 into a luminance signal $Y_{color}$ and a chrominance signal Cr, Cb by using, for example, the formula (1). However, the YC conversion unit 115 according to the present embodiment outputs, to the subsequent stage, not only the chrominance signal Cr, Cb obtained via conversion but also the luminance signal $Y_{color}$ obtained via conversion.

In accordance with switching of the deformable mirror 121, the selection unit 122 selects an output signal from the YC conversion unit 115 (i.e. a signal based on the output from the color imager 102) or an output signal from the A/D conversion unit 109 (i.e., a signal based on the output from the monochrome imager 103) under the control of the control unit 112, and outputs it to the subsequent stage. That is, when the deformable mirror 121 leads the observation light path a to the color imager 102, the selection unit 122 selects the output signal from the YC conversion unit 115 (i.e., the chrominance signal Cr, Cb and the luminance signal $Y_{color}$) and outputs it to the subsequent stage. Meanwhile, when the deformable mirror 121 leads the observation light path a to the monochrome imager 103, the selection unit 121 selects an output signal from the A/D conversion unit 109 as an luminance signal $Y_{mono}$ and outputs it to the subsequent stage.

The color information calculation unit 116 according to the present embodiment performs the following process in accordance with the output signal from the selection unit 122. That is, when the output signals from the selection unit 122 are a chrominance signal Cr, Cb and a luminance signal $Y_{color}$, the color information calculation unit 116 converts these signals into color information on R, G, and B by using, for example, the formula (2), and outputs it to the subsequent stage. Meanwhile, when the output signal from the selection unit 122 is a luminance signal $Y_{mono}$, the color information calculation unit 116 directly outputs this signal to the subsequent stage.

As described above, in accordance with the operator's instruction, the image formation unit 113 according to the present embodiment forms a color image or a monochrome image from a signal which is based on an output from the color imager 102 or the monochrome imager 103.

The flow of processing series performed by the image pick-up apparatus 300 having such a configuration is generally as follows.

First, when the deformable mirror 121 switches the observation light path a in accordance with the operator's instruction so that the observation light path a leads to the color imager 102, the following process will be performed.

In this case, an observation image of a sample sent from the microscope 200 along the observation light path a is formed on and picked up by the color imager 102. The exposure time period of the color imager 102 is controlled by the control unit 112. Next, the preprocessing unit 104 converts the electrical signal output from the preceding stage into an image signal, and outputs it to the subsequent stage. The conversion into the image signal performed by the preprocessing unit 104 depends on a control pulse output from the TG 111. Next, the amplification unit 106 amplifies the image signal output from the preceding stage and outputs it to the subsequent stage. The amplification of the image signal performed by the amplification unit 106 depends on the amplification factor set by the control unit 112. Next, the A/D conversion unit 108 converts the image signal (an analog signal) amplified in the preceding stage into a digital signal and outputs it to the image processing unit 110. The conversion by the A/D conversion unit 108 is performed under the control of the control unit 112. Next, in the image processing unit 110, the color filter processing unit 114 obtains color information on R, G, and B from the output signal from the A/D conversion unit 108, and outputs it to the image formation unit 113. Next, in the image formation unit 113, the YC conversion unit 115 converts the color information on R, G, and B output from the color filter processing unit 114 into a chrominance signal Cr, Cb and a luminance signal $Y_{color}$ by using, for example, the formula (1), and outputs these signals to the selection unit 122. Next, under the control of the control unit 112, the selection unit 122 selects the chrominance signal Cr, Cb and the luminance signal $Y_{color}$ and outputs them to the color information calculation unit 116. Next, the color information calculation unit 116 converts the chrominance signal Cr, Cb and the luminance signal $Y_{color}$ output from the selection unit 122 into color information on R, G, and B by using, for example, the formula (2), and outputs it to the subsequent stage. Through such a processing series, the color image of an observation image of a sample sent from the microscope (the body of a microscope) 200 is formed.

Meanwhile, when the deformable mirror 121 switches the observation light path a in accordance with the operator's instruction so that the observation light path a leads to the monochrome imager 103, the following process will be performed.

In this case, an observation image of a sample sent from the microscope 200 along the observation light path a is formed on and picked up by the monochrome imager 103. The exposure time period of the monochrome imager 103 is controlled by the control unit 112. Next, the preprocessing unit 105 converts the electrical signal output from the preceding stage into an image signal, and outputs it to the subsequent stage. The conversion into the image signal performed by the preprocessing unit 105 depends on a control pulse output from the TG 111. Next, the amplification unit 107 amplifies the image signal output from the preceding stage and outputs it to the subsequent stage. The amplification of the image signal performed by the amplification unit 107 depends on the amplification factor set by the control unit 112. Next, the A/D conversion unit 109 converts the image signal (an analog signal) amplified in the preceding stage into a digital signal and outputs it to the image formation unit 113 of the image processing unit 110. The conversion by the A/D conversion unit 109 is performed under the control of the control unit 112. Next, in the image formation unit 113, under the control of the control unit 112, the selection unit 122 selects the output signal from the A/D conversion unit 109 as a luminance signal $Y_{mono}$ and outputs it to the color information calculation unit 116. Next, the color information calculation unit 116 directly outputs, to the subsequent stage, the luminance signal $Y_{mono}$ output from the selection unit 122. Through such a processing series, the monochrome image of an observation image of a sample sent from the microscope (the body of a microscope) 200 is formed.

As described above, the image pick-up apparatus 300 according to the present embodiment can be used as a color camera or a monochrome (black and white) camera in accordance with an object to be observed as well as it enables an observation image of a sample to be efficiently used for picking up the image.

Embodiment 3

An image pick-up apparatus according to embodiment 3 of the present invention is an apparatus that can form a color image by picking up an observation image of a sample (not shown) observed under a microscope.

Figure 5:
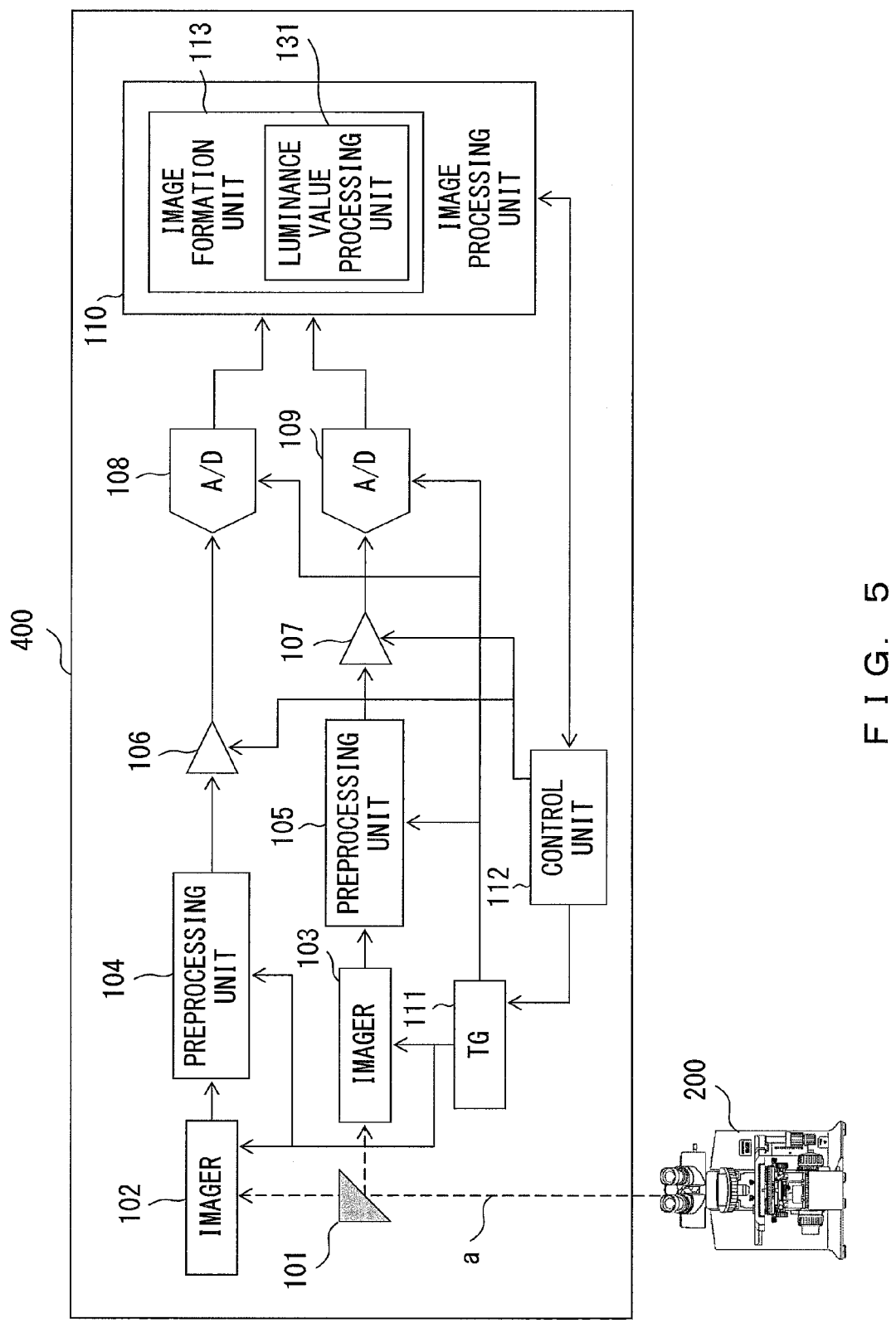
FIG. 5 is a diagram showing an exemplary configuration of an image pick-up apparatus according to embodiment 3.

FIG. 5 is a diagram showing an exemplary configuration of an image pick-up apparatus according to the present embodiment.

As shown in FIG. 5, the image pick-up apparatus 400 according to the present embodiment is different from the image pick-up apparatus 100 according to embodiment 1 shown in FIG. 1 in the following respects.

The image pick-up apparatus 400 is different in the sense that the configuration of the image formation unit 113 is partly different (e.g., the image formation unit 113 further includes a luminance value processing unit 131). In accordance with this difference, the image pick-up apparatus 400 is different in the sense that the control unit 112 further controls the luminance value processing unit 131.

In regard to the points other than the differences above, the configuration of the image pick-up apparatus 400 is the same as that of the image pick-up apparatus 100 according to embodiment 1. Accordingly, like components are indicated by like numerals indicating the components of the image pick-up apparatus 100 according to embodiment 1.

In the image pick-up apparatus 400 according to the present embodiment, under the control of the control unit 112, the luminance value processing unit 131 compares a luminance value relating to the luminance signal $Y_{color}$ obtained from the signal based on the output from the color imager 102 with a luminance value relating to the luminance signal $Y_{mono}$ obtained from the signal based on the output from the monochrome imager 103, and it performs processes in accordance with the result of the comparison. These processes performed by the luminance value processing unit 131 will be described later in detail.

Figure 6:
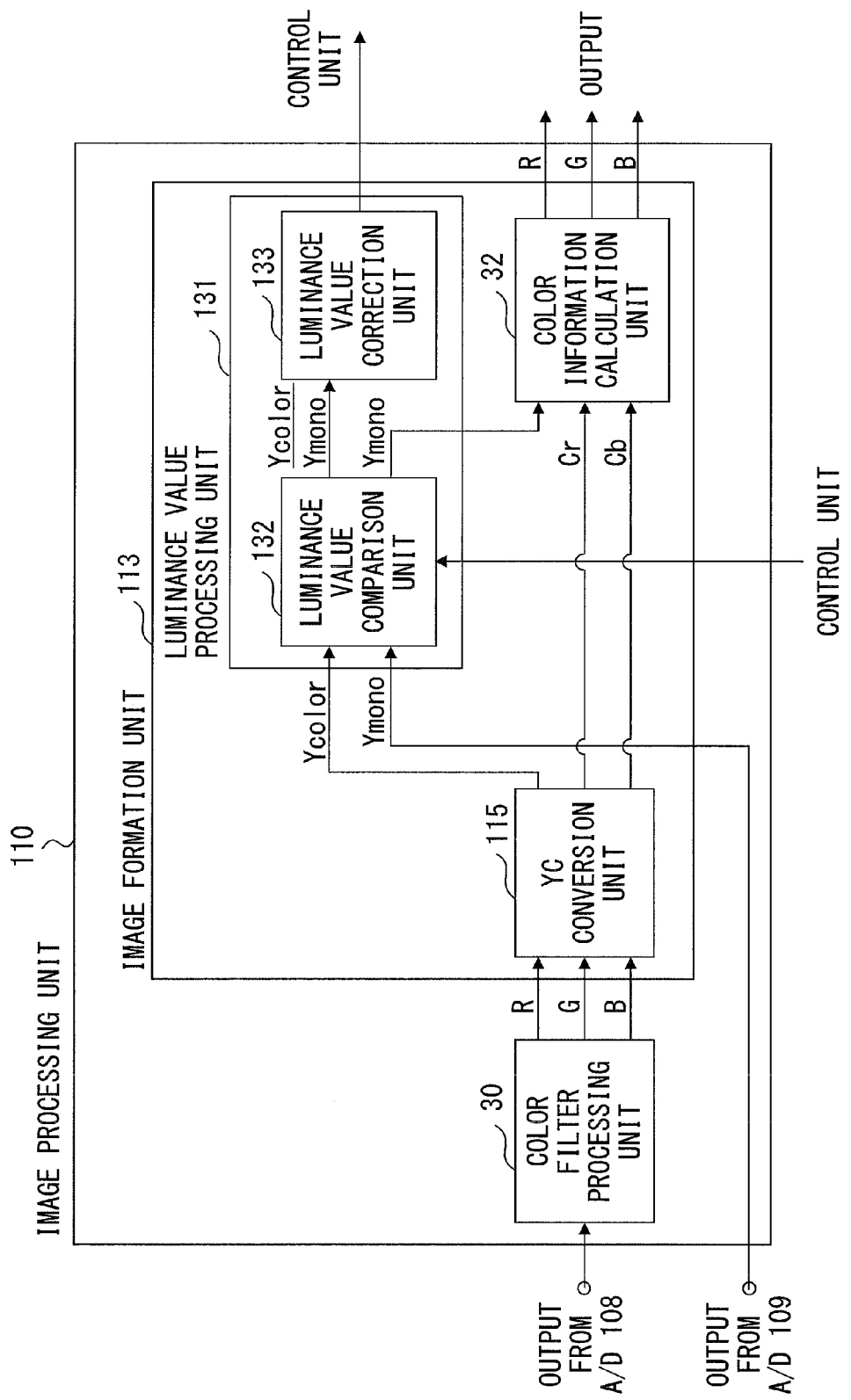
FIG. 6 is a diagram showing an exemplary configuration of an image processing unit according to embodiment 3 in more detail.

FIG. 6 is a diagram showing an exemplary configuration of an image processing unit 110 according to the present embodiment in more detail.

As shown in FIG. 6, the image processing unit 110 according to the present embodiment is the same as the image processing unit 110 according to embodiment 1 in the sense that the image processing unit 110 according to the present embodiment includes a color filter 114 and an image formation unit 113 as main components; however, the configuration of the image formation unit 113 of the image processing unit 110 according to the present embodiment is partly different.

That is, the image formation unit 113 according to the present embodiment further includes the luminance value processing unit 131 provided with a luminance value comparison unit 132 and a luminance value correction unit 133. Accordingly, the process flow is different from that of the image formation unit 113 according to embodiment 1.

The YC conversion unit 115 of the image formation unit 113 according to the present embodiment is the same as the YC conversion unit 115 according to embodiment 1 in the sense that the YC conversion unit 115 of the image formation unit 113 according to the present embodiment converts color information on R, G, and B obtained from the color filter processing unit 114 into a luminance signal $Y_{color}$ and a chrominance signal Cr, Cb by using, for example, the formula (1) and that it outputs the chrominance signal Cr, Cb to the color information calculation unit 116. However, the YC conversion unit 115 according to the present embodiment further outputs the luminance signal $Y_{color}$ obtained via the conversion to the luminance value comparison unit 132 of the luminance value processing unit 131. The YC conversion unit 115 according to the present embodiment is an example of the calculation unit for calculating a chrominance signal and a first luminance signal from the signal which is based on an output from the color imager 102. The luminance signal $Y_{color}$ obtained via the conversion by the YC conversion unit 115 is an example of the first luminance signal.

Under the control of the control unit 112, the luminance value comparison unit 132 uses an output signal from the A/D conversion unit 109 as the luminance signal $Y_{mono}$ and performs a process in which the luminance value relating to the luminance signal $Y_{mono}$ is compared with the luminance value relating to the luminance signal $Y_{color}$ output from the YC conversion unit 115 or a process in which they are not compared.

When the luminance value comparison unit 132 performs, under the control of the control unit 112, the process in which the luminance value relating to the luminance signal $Y_{mono}$ is compared with the luminance value relating to the luminance signal $Y_{color}$, then it further performs the following process in accordance with the result of the comparison. That is, when it is determined as a result of the comparison that the luminance value relating to the luminance signal $Y_{mono}$ and the luminance value relating to the luminance signal $Y_{color}$ are not essentially identical with each other, a signal representing the luminance value relating to the luminance signal $Y_{mono}$ and the luminance value relating to the luminance signal $Y_{color}$ is output to the luminance value correction unit 133. Meanwhile, when the luminance value relating to the luminance signal $Y_{mono}$ and the luminance value relating to the luminance signal $Y_{color}$ are essentially identical with each other, the luminance signal $Y_{mono}$ is directly output to the color information calculation unit 116. The luminance value comparison unit 132 is an example of a comparison unit for using a signal based on an output from the monochrome imager as a second luminance signal and for comparing a first luminance signal calculated by a calculation unit with the second luminance signal.

Meanwhile, when the luminance value comparison unit 132 performs, under the control of the control unit 112, the process in which the luminance value relating to the luminance signal $Y_{mono}$ is not compared with the luminance value relating to the luminance signal $Y_{color}$, then it directly outputs the luminance signal $Y_{mono}$ to the color information calculation unit 116.

From the luminance value relating to the luminance signal $Y_{mono}$ and the luminance value relating to the luminance signal $Y_{color}$ represented by the signal output from the luminance value comparison unit 132, the luminance value correction unit 133 calculates an exposure time period of the color imager 102 such that the luminance value relating to the luminance signal $Y_{mono}$ and the luminance value relating to the luminance signal $Y_{color}$ become essentially identical with each other, and it outputs a signal representing the exposure time period to the control unit 112. The luminance value correction unit 133 is an example of an image pick-up parameter calculation unit for, when the luminance value relating to the first luminance signal and the luminance value relating to the second luminance signal are not essentially identical with each other, calculating an image pick-up parameter of the color imager such that the luminance value relating to the first luminance signal and the luminance value relating to the second luminance signal become essentially identical with each other. The exposure time period calculated by the luminance value correction unit 133 is an example of an image pick-up parameter.

The color information calculation unit 116 according to the present embodiment converts the luminance signal $Y_{mono}$ output from the luminance value comparison unit 132 and the chrominance signal Cr, Cb output from the YC conversion unit 115 into color information on R, G, and B by using, for example, the formula (2), and it outputs the color information to the subsequent stage.

The flow of processing series performed by the image pick-up apparatus 400 having such a configuration is generally as follows.

The image pick-up apparatus 400 is the same as the image pick-up apparatus 100 according to embodiment 1 in the sense that the light path of an observation image of a sample sent from the microscope 200 along the observation light path a is divided by the prism 101 into two paths, one of which is sent to the color imager 102 and converted into an image and the other of which is sent to the monochrome imager 103 and converted into an image, and that the observation images formed by the color imager 102 and the monochrome imager 103 are simultaneously picked up. The image pick-up apparatus 400 is the same as the image pick-up apparatus 100 according to embodiment 1 also in terms of the flow of the process from the operation performed by the color imager 102 to the operation performed by the YC conversion unit 115 of the image formation unit 113 in the image formation unit 110 and the flow of the process from the operation performed by the monochrome imager 103 to the operation performed by the A/D conversion unit 109.

However, the image pick-up apparatus 400 according to the present embodiment is different as follows in terms of the flow of the subsequent processes.

That is, in the image formation unit 113 according to the present embodiment, the YC conversion unit 115 outputs the luminance signal $Y_{color}$ obtained via conversion to the luminance value comparison unit 132 and outputs the chrominance signal Cr, Cb obtained via conversion to the color information calculation unit 116.

Next, under the control of the control unit 112, the luminance value comparison unit 132 uses an output signal from the A/D conversion unit 109 as the luminance signal $Y_{mono}$ and compares a luminance value relating to the luminance signal $Y_{mono}$ with a luminance value relating to the luminance signal $Y_{color}$ which is output from the YC conversion unit 115. When these two values are not essentially identical with each other, a signal representing the luminance value relating to the luminance signal $Y_{mono}$ and the luminance value relating to the luminance signal $Y_{color}$ is output to the luminance value correction unit 133, and when they are essentially identical with each other, the luminance signal $Y_{mono}$ is output to the color information calculation unit 116.

Whether or not the two luminance values are essentially identical with each other is determined as follows: A value $\alpha$ is calculated using, for example, the following formula (3); When $\alpha \approx 1$ is not achieved, it may be determined that the two luminance values are not essentially identical with each other, and when $\alpha \approx 1$ is achieved, it may be determined that the two luminance values are essentially identical with each other.

$$\alpha = (\text{Luminance value relating to luminance signal } Y_{color})/(\text{Luminance value relating to luminance signal } Y_{mono}) \quad \text{Formula (3)}$$

When it is determined as a result of the comparison by the luminance value comparison unit 132 that the two luminance values are essentially identical with each other, the color information calculation unit 116 converts the luminance signal $Y_{mono}$ output from the luminance value comparison unit 132 and the chrominance signal Cr, Cb output from the YC conversion unit 115 into color information on R, G, and B by using, for example, the formula (2), and it outputs the color information. As described above, when it is determined as a result of the comparison by the luminance value comparison unit 132 that the two luminance values are essentially identical with each other, the flow of the processes performed by the image pick-up apparatus 400 according to the present embodiment is generally the same as the flow of the processes performed by the image pick-up apparatus 100 according to embodiment 1.

Meanwhile, when it is determined as a result of the comparison by the luminance value comparison unit 132 that the two luminance values are not essentially identical with each other, then, from the luminance value relating to the luminance signal $Y_{mono}$ and the luminance value relating to the luminance signal $Y_{color}$ represented by the signal output from the luminance value comparison unit 132, the luminance value correction unit 133 calculates an exposure time period $T_{new}$ of the color imager 102 such that the two luminance values are essentially identical with each other, and it outputs the signal representing the exposure time period $T_{new}$ to the control unit 112. The exposure time period $T_{new}$ can be calculated using, for example, the following formula (4).

$$T_{new} = T/\alpha \quad \text{Formula (4)}$$

Here, T indicates an exposure time period during which the color imager 102 is exposed to obtain a signal that is the origin of the luminance signal $Y_{color}$. T also indicates an exposure time period during which the monochrome imager 103 is exposed to obtain a signal that is the origin of the luminance signal $Y_{mono}$. The value $\alpha$ is calculated using the formula (3).

Next, the control unit 112 controls the TG 111 so as to set, for the color imager 102, the exposure time period $T_{new}$ represented by the signal output from the luminance value correction unit 133. An exposure time period T set for the monochrome imager 103 is not changed.

Next, the color imager 102 and the monochrome imager 103 simultaneously pick up an observation image again. However, the color imager 102 picks up the image under the exposure time period $T_{new}$, and the monochrome imager 103 picks up the image under the exposure time period T.

The flow of the subsequent processes is essentially the same as the flow of the aforementioned processes; however, it is different only in the sense that the luminance value comparison unit 132 does not perform the aforementioned comparison process under the control of the control unit 112 but the output signal from the A/D conversion unit 109 used as the luminance signal $Y_{mono}$ is directly output to the color information calculation unit 116. In this case, accordingly, the color information calculation unit 116 converts the luminance signal $Y_{mono}$ (i.e. a signal based on the output from the monochrome imager 103 obtained under the exposure time period T) and the chrominance signal Cr, Cb (i.e., a signal based on the output from the color imager 102 obtained under the exposure time period $T_{new}$) into color information on R, G, and B by using, for example, the formula (2), and it outputs the color information. In this way, a color image is formed by using the chrominance signal Cr, Cb which is calculated by the YC conversion unit 115 from the signal based on the output from the color imager 102 after the exposure time period $T_{new}$ calculated by the luminance value correction 133 is set for the color imager 102, and by using the signal, i.e., the luminance signal $Y_{mono}$, based on the output from the monochrome imager 103 after the exposure time period $T_{new}$ is set for the color imager 102.

Through such a processing series, the color image of an observation image of a sample sent from the microscope (the body of a microscope) 200 is formed.

As described above, according to the image pick-up apparatus 400 according to the present embodiment, even if the color imager 102 and the monochrome imager 103 have different sensitivities, the sensitivities can be adapted to each other by setting, for the color imager 102, the exposure time period $T_{new}$ calculated by the luminance value correction unit 133. Therefore, when the color information calculation unit 116 again converts a luminance signal and a chrominance signal into color information, it is possible not only to prevent a conversion error but also to suppress the reduction in luminance resolution.

The image pick-up apparatuses according to embodiments 1 to 3 described above have various modifications.

As an example, the image pick-up apparatuses according to the embodiments may be configured so that functions equivalent to the control unit 112 and the image processing unit 110 are achieved by a CPU incorporated to a personal computer (PC) or a certain apparatus. This can be implemented if a program for achieving the equivalent functions is stored in a memory and the CPU of the PC or the CPU incorporated to the apparatus reads and executes the program.

As another example, the image pick-up apparatuses according to embodiments 1 and 3 may be configured so that, instead of the prism 101, they are provided with another optical element, such as a half mirror, which can divide the observation light path a into two paths.

As another example, the image pick-up apparatus according to embodiment 2 may be configured so that, instead of the deformable mirror 121, it is provided with a mechanism enabling one of the color imager 102 and the monochrome imager 103 to be inserted in the observation light path a. In this case, the mechanism may be, for example, a sliding mechanism which indicates a straight trajectory of movement when one of the color imager 102 and the monochrome imager 103 is inserted in the observation light path a as shown in FIG. 7A. Alternatively, as shown in, for example, FIG. 7B, the configuration can be made such that a rotary type mechanism is provided, wherein the rotary type mechanism indicates a circular trajectory of movement when one of the color imager 102 and the monochrome imager 103 is inserted in the observation light path a. The configuration may be made such that such a mechanism is controlled by the control unit 112 in accordance with the operator's instruction. Such a mechanism can also be applied to the image pick-up apparatuses according to embodiments 1 and 3, if the temporal difference in the timing of image pick-up between the color imager 102 and the monochrome imager 103 is within an acceptable level.

As another example, the image pick-up apparatus according to embodiment 2 may be configured so that it is provided with a mechanism which inserts, in the observation light path a, any of the prism 101 for dividing the observation light path a into two paths, a full transmission prism for guiding an observation image from the microscope 200 to the color imager 102, and a total reflection prism for guiding the observation image from the microscope 200 to the monochrome imager 103, instead of inserting the deformable mirror 121. Such a mechanism is an example of a light guiding unit for guiding, to the color imager 102 and/or the monochrome imager 103, light originating from a subject. The configuration may be made such that such a mechanism is controlled by the control unit 112 in accordance with the operator's instruction. In regard to an image pick-up apparatus having such a configuration, if necessary, the luminance resolution reduction can be suppressed via the operator giving an instruction to insert the prism 101 into the observation light path a. The flow of the processes performed in this case is essentially the same as that of the processes performed by the image pick-up apparatus 100 according to embodiment 1; however, the flow of the processes performed by the image formation unit 113 will be as follows. That is, under the control of the control unit 112, the selection unit 122 in the image formation unit 113 selects a luminance signal $Y_{mono}$ and a chrominance signal Cr, Cb from among a luminance signal $Y_{color}$ which is output from the YC conversion unit 115, the chrominance signal Cr, Cb which are output from the YC conversion unit 115, and the luminance signal $Y_{mono}$ which is an output signal from the A/D conversion unit 109, and it outputs the luminance signal $Y_{mono}$ and the chrominance signal Cr, Cb to the color information calculation unit 116. The color information calculation unit 116 then converts the chrominance signal Cr, Cb and the luminance signal $Y_{mono}$ into color information on R, G and B by using, for example, the formula (2) and outputs it. Through such a flow of processes, luminance resolution reduction can be suppressed. Meanwhile, monochrome image shooting can be performed via the operator giving an instruction to insert the total reflection prism for guiding an observation image to the monochrome imager 103. The flow of the processes in this case is the same as the aforementioned flow of the processes performed when the observation light path a is switched by the deformable mirror 121 so that it leads to the monochrome imager 103. Alternatively, color image shooting can be performed via the operator giving an instruction to insert the full transmission prism for guiding an observation image to the color imager 102. The flow of the processes in this case is the same as the aforementioned flow of the processes performed when the observation light path a is switched by the deformable mirror 121 so that it leads to the color imager 102. The image formation unit 113 in the image pick-up apparatus having such a configuration is an example of an image formation unit for forming an image from a signal based on an output from the color imager 102 and/or the monochrome imager 103. The image pick-up apparatus having such a configuration may also be configured so that the operator can manually insert one of the prism 101, a full transmission prism, and a total reflection prism in the observation path a.

In, for example, the image pick-up apparatus 400 according to embodiment 3, the exposure time period of the color imager 102 is changed so that the luminance value relating to the luminance signal $Y_{mono}$ and the luminance value relating to the luminance signal $Y_{color}$ are made to be essentially identical with each other; however, the luminance values may be made essentially identical with each other using another technique. Some of the examples of the other technique are a technique in which the light quantities of the divisions of the light path divided by the prism 101 are changed; a technique in which the amplification factors of the amplification units 106 and 107 are changed; and a technique in which, in a conversion formula for converting a luminance signal Y and a chrominance signal Cr, Cb into color information on R, G, and B (e.g., the formula (2)), $1/\alpha$ is assigned to a coefficient to be multiplied by the luminance signal Y (note: the value $\alpha$ can be calculated from the formula (3)).

In, for example, the image pick-up apparatus 400 according to embodiment 3, when a luminance value relating to a luminance signal $Y_{mono}$ and a luminance value relating to a luminance signal $Y_{color}$ are not essentially identical with each other, an exposure time period $T_{new}$ of the color imager 102 is calculated such that the luminance values are essentially identical with each other; however, the exposure time period $T_{new}$ may be calculated using another technique. The other technique may be, for example, a technique in which, for each combination of the color imager 102 and the monochrome imager 103, information relating to the ratio between the sensitivity of the color imager 102 and that of the monochrome imager 103 is stored in advance in a memory (not shown), and an exposure time period $T_{new}$ of the color imager 102 is calculated on the basis of information relating to the ratio between the sensitivities typical of the corresponding combination.

In, for example, the image pick-up apparatus 400 according to embodiment 3, an exposure time period $T_{new}$ of the color imager 102 is calculated such that the luminance value relating to a luminance signal $Y_{mono}$ and the luminance value relating to a luminance signal $Y_{color}$ are essentially identical with each other; however, the configuration may be made such that an exposure time period $T_{new}$ of the color imager 102 is optionally set in accordance with a luminance value desired by the operator.

The image pick-up apparatuses according to the embodiments may be configured so that they are provided with a plurality of color imagers each having a different number of pixels and a plurality of monochrome imagers each having a different number of pixels. In this case, however, a mechanism for inserting any of the plurality of color imagers in the light path and a mechanism for inserting any of the plurality of monochrome imagers in the light path are provided, and the mechanisms are controlled so that the number of pixels of the color imagers used for forming a single image is the same as the number of pixels of the monochrome imagers used for this image.

The embodiments of the present invention are not limited to those described above. Various modifications and changes can be made to the aforementioned embodiments without departing from the spirit of the invention.

What is claimed is:

1. An image pick-up apparatus comprising:
a color imager having a color filter formed on a light receiving surface thereof; a monochrome imager not having a color filter formed on a light receiving surface thereof; a light guiding unit for guiding, to the color imager and/or the monochrome imager, light originating from a subject; and an image formation unit for forming an image from a signal which is based on an output from the color imager and/or the monochrome imager; wherein: the light guiding unit guides, to the color imager and the monochrome imager, the light originating from the subject; the image formation unit includes a calculation unit for calculating a chrominance signal and a first luminance signal from a signal based on an output from the color imager, and a comparison unit for using a signal based on an output from the monochrome imager as a second luminance signal and for comparing a luminance value relating to the first luminance signal calculated by the calculation unit with a luminance value relating to the second luminance signal, and an image pick-up parameter calculation unit for calculating an image pick-up parameter of the color imager such that the luminance value relating to the first luminance signal and the luminance value relating to the second luminance signal become essentially identical with each other, when the luminance value relating to the first luminance signal and the luminance value relating to the second luminance signal are not essentially identical with each other as a result of the comparison by the comparison unit, wherein a color image is formed using a chrominance signal calculated by the calculation unit from a signal based on an output from the color imager after the image pick-up parameter calculated by the image pick-up parameter calculation unit is set for the color imager and a luminance signal which is a signal based on an output from the monochrome imager after the image pick-up parameter is set for the color imager.

2. The image pick-up apparatus according to claim 1, wherein:
the light guiding unit guides, to the color imager and the monochrome imager, the light originating from the subject;
the image formation unit includes a calculation unit for calculating a chrominance signal from a signal based on an output from the color imager; and
the image formation unit uses a signal based on an output from the monochrome imager as a luminance signal and forms a color image by using the luminance signal and the chrominance signal calculated by the calculation unit.

3. The image pick-up apparatus according to claim 1, wherein:
in accordance with an instruction from an operator, the light guiding unit guides, to the color imager and/or the monochrome imager, the light originating from the subject; and
in accordance with the instruction, the image formation unit forms an image from a signal based on an output from the color imager and/or the monochrome imager.

4. The image pick-up apparatus according to claim 1, wherein
when the luminance value relating to the first luminance signal and the luminance value relating to the second luminance signal are essentially identical with each other as a result of the comparison by the comparison unit, the image formation unit forms a color image using the second luminance signal and the chrominance signal calculated by the calculation unit.

5. The image pick-up apparatus according to claim 1, wherein
the light guiding unit is an optical element that divides a light path of the light originating from the subject into two paths, and the light guiding unit guides, to the color imager and the monochrome imager, the light originating from the subject.

6. The image pick-up apparatus according to claim 1, wherein
the light guiding unit is a deformable mirror and guides, to the color imager or the monochrome imager, the light originating from the subject.

7. The image pick-up apparatus according to claim 1, wherein,
the light guiding unit is a mechanism which inserts, in a light path of the light originating from the subject, one of the color imager and the monochrome imager, and the light guiding unit guides, to the color imager or the monochrome imager, the light originating from the subject.

8. The image pick-up apparatus according to claim 1, wherein,
the light guiding unit is a mechanism which inserts, in a light path of the light originating from the subject, any of an optical element which divides a light path into two paths, an optical element which guides, to the color imager, the light originating from the subject, and an optical element which guides, to the monochrome imager, the light originating from the subject, and
the light guiding unit guides, to the color imager and/or the monochrome imager, the light originating from the subject.

* * * * *